Patented Nov. 3, 1936

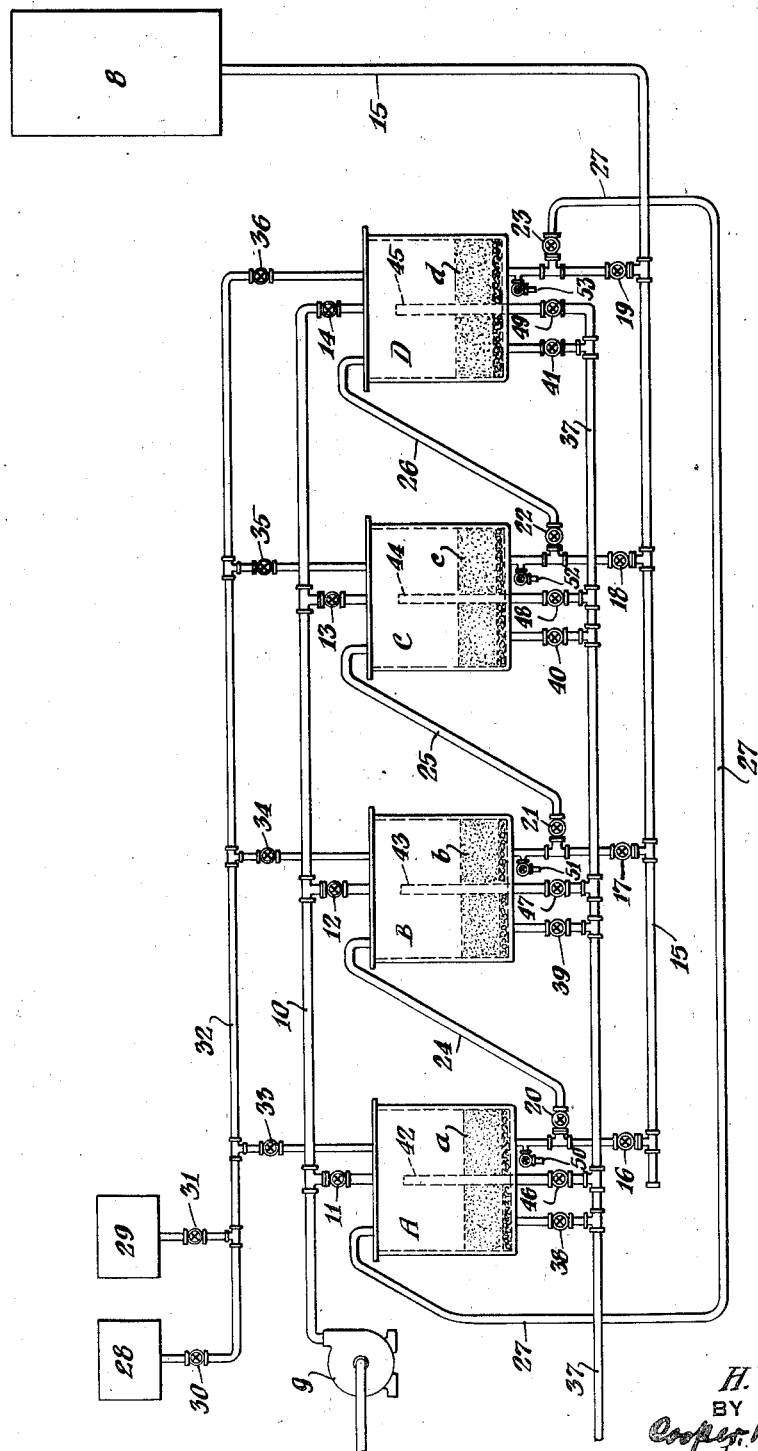

2,059,552

UNITED STATES PATENT OFFICE 2,059,552

SOFTENING WATER

Harry V. Churchill, New Kensington, Pa.

Application October 2, 1933, Serial No. 691,758

14 Claims. (Cl. 210—16)

This invention relates to a method of purifying water by the removal of dissolved inorganic impurities and it is particularly concerned with a method for the removal of hardness-producing substances from water.

Most waters contain in solution a substantial amount of inorganic matter, for instance sodium, potassium, calcium, magnesium, iron, and aluminum, and sometimes small amounts of other elements, usually as salts of hydrochloric, carbonic, and sulfuric acids; depending upon the source of the water and any purifying or other treatment to which it may have been subjected. The presence of such dissolved inorganic salts may make the water unsatisfactory for certain uses. For example, the salts of magnesium and calcium, particularly the sulfates and carbonates or bicarbonates, impart hardness to the water. These so-called hard waters are objectionable because of their high soap-consuming properties and, in industrial use, particularly for boiler waters, because of the scale formed in the boilers by the salts precipitated from solution. Iron also imparts some hardness to the water, and it is also an objectionable impurity in waters intended for certain specific uses, for example in the rayon industry. Various methods have been proposed for removing the hardness-producing materials from water. The chief methods which have found extended commercial application are the soda-lime processes and the zeolite processes. These depend upon the chemical substitution of an alkali metal for the calcium and magnesium in the compounds thereof which are in solution in the water, with precipitation of the calcium and magnesium as insoluble compounds. All of these methods involve, because of the nature of the reactions upon which they depend, an increase in the total dissolved solids in the water.

It is an object of this invention to provide a simple method for treating water for the removal of dissolved hardness-producing substances without replacing said substances with other inorganic materials dissolved in the water, whereby a simultaneous reduction of the total solids content of the water is obtained. It is more particularly an object of this invention to provide a method for the adsorption of hardness-producing inorganic salts from solution in water. A further object of my invention is to provide a continuous method of softening water and simultaneously reducing its total dissolved solids content. Other objects will appear in the following detailed description of my invention.

I have discovered that activated alumina possesses the property of removing by adsorption calcium and magnesium sulfates and carbonate. I have found also that by means of activated alumina which has been prepared at a temperature of 400° to 500° C. such calcium and magnesium compounds can in many cases be removed completely, producing a water of zero hardness by the standard soap test. The acid radicals removed by the treatment with activated alumina are stoichiometrically equivalent to the calcium and magnesium removed. The calcium and magnesium are not, so far as I have been able to detect, removed as aluminates. Iron is also taken out in the course of the process. Furthermore, I have found that the calcium and magnesium compounds adsorbed by the activated alumina from the water may be removed from the alumina by treatment with dilute acid solutions and that the power of the activated alumina to remove calcium and magnesium salts from solution in water after having been exhausted by treatment of a relatively large quantity of water, may be regenerated by simple washing with such acid solutions without the necessity of reactivation by heating.

The activated alumina preferred for use in the treatment of water according to my invention is an adsorptive aluminous material the active adsorbing portion of which is composed of aluminum hydrate which has been calcined at a temperature of 300 to 800° C. Activation by heating at 400 to 500° C. for about two hours is preferred. The capacity of removing all of the calcium and magnesium carbonates and/or sulfates (i. e., the capacity at 100 per cent efficiency) is not, however, the total capacity of the activated alumina for adsorbing calcium and magnesium compounds. On the contrary, when this capacity at 100 per cent efficiency is exhausted the alumina will continue to adsorb the compounds referred to, so that relatively large quantities of water may be treated before the adsorbent alumina requires regeneration.

In the operation of my process I have found that certain forms of massive activated alumina are particularly satisfactory for use. One form which may be designated as activated alumina scale may be obtained by the calcination of the massive form of aluminum hydrate deposited from the sodium aluminate solution in the form of scale in the alumina precipitator tanks during the practice of the Fickes-Sherwin modification of the Bayer process for the production of purified alumina. The other form of massive activated alumina which I have found particularly useful is activated bauxite prepared by calcining bauxite, the naturally occurring form of aluminum hydrate. The bauxite used in the preparation of activated bauxite for the purposes of this invention should contain not more than 0.25 per cent of sulfate, and should preferably be substantially free from sulfates, as their presence in substantial amount in the activated bauxite reduces its adsorptive properties. It is preferable also that activated bauxite be thoroughly washed prior to its use in water treatment in order to remove any soluble compounds which may have been formed from the impurities by the activation. For use in my invention the massive activated alumina is broken up or crushed to granular form.

The hydrogen ion concentration of the water to be treated is not critical but I have obtained best results with water alkaline to methyl red. Good efficiency is obtained, however, by treating waters having a pH upwards of 8.0.

The capacity of the activated alumina to remove the hardness-producing compounds from water may be restored to spent material, that is, the material may be regenerated, by washing with dilute alkali or dilute acid. However I have found that a regeneration treatment combining an acid and an alkaline wash is most effective. Various acids have proved satisfactory for this purpose including hydrochloric, tartaric, citric and acetic acids, but I prefer to use dilute solutions of the first mentioned. The alkaline wash may be carried out with a solution of sodium, potassium or ammonium hydroxide, but I prefer to use solutions of the latter. In one form of regeneration treatment from which I have obtained particularly good results the spent activated alumina is washed with hydrochloric acid solution (1 per cent by weight of HCl) until the effluent is just acid to methyl red. The bed is then washed with ammonia solution (1 per cent by weight of NH₃) until the effluent is just alkaline to phenolphthalein. The bed is finally washed with water, preferably with water which has been treated to remove dissolved calcium and magnesium compounds.

The treatment with activated alumina may be carried out by any suitable means for bringing the water and the adsorbent into contact. For this purpose I have found it most desirable to cause the water to percolate through a bed of the adsorbent formed of massive activated alumina crushed to about 20 to 35 mesh. Beds of such material present the advantage of permitting rapid flow of the water while presenting a large adsorptive surface. Furthermore, the massive forms of activated alumina will retain their form without breaking up or powdering on long continued use and regeneration. The treatment of the water may be carried out by a discontinuous method, using a single bed of adsorbent with alternate cycles of water treatment and adsorbent regeneration. This type of method may prove satisfactory where relatively small quantities of water are to be treated. However, intermittent treatment of water is inefficient, particularly for the production of water completely free from hardness-producing compounds, since in such case the adsorbent can be used only to the extent of its capacity at 100 per cent efficiency before regeneration is required.

My invention accordingly contemplates in its preferred form a continuous method in which the water is passed through activated alumina containing successively less calcium and magnesium componds previously adsorbed, and finally through alumina still capable of adsorbing such compounds at 100 per cent efficiency.

In the accompanying drawing is illustrated one form of apparatus suitable for carrying out the continuous treatment of water for the removal of hardness according to my invention.

Referring to the drawing, columns A, B, C and D containing beds or columns a, b, c, d of activated alumina are connected by pipe 10 and valves 11, 12, 13 and 14 with a source of raw water, and by pipe 15 and valves 16, 17, 18 and 19 with a storage tank 8 for treated water. Each column A, B, C, D is also connected to the next in series by the valves 20, 21, 22 and 23 and the pipes 24, 25, 26 and 27. By proper operation of these valves the water may be passed from the source through any two or more of the adsorbent beds to the storage tank while the remainder of the beds may be cut out of the system for regeneration. The adsorbent beds are also connected with tanks 28 and 29 containing the regenerating solutions by valves 30 and 31, pipe 32 and valves 33, 34, 35 and 36, and to the waste pipe 37 by valves 38, 39, 40 and 41. Each adsorbent bed is also provided with an overflow connection 42, 43, 44 and 45 through valves 46, 47, 48 and 49 to the waste pipe 37. Sampling cocks 50, 51, 52, 53 are provided between the columns A, B, C, D and pipe 15.

In carrying out in the preferred way the continuous process of my invention in this form of apparatus the adsorbent columns are charged with activated alumina scale prepared by heating at a temperature of 400 to 500° C. for two hours. The raw water to be treated is forced into the system by pump 9 through pipe 10 and passes through valve 11 into column A where it percolates through the adsorbent bed a. As long as the water coming from this bed shows zero hardness it may be passed through valve 16 and pipe 15 directly to the storage tank 8. Ultimately, however, the adsorbent capacity at 100 per cent efficiency of bed a will be exhausted. When this point is reached, the water coming from bed a will not be completely softened, although it will have its hardness content reduced. This effluent water, instead of going directly to the storage tank, is passed through valve 20 and pipe 24 into column B where it percolates through the adsorbent to remove the last traces of hardness, and then through valve 17 and pipe 15 to storage tank. When the adsorptive capacity at 100 per cent efficiency of bed b is exhausted, the water is passed through valve 21 and pipe 25 to bed c and thence to storage tank through valve 18 and pipe 15. When bed c ceases to operate at 100 per cent efficiency the water is passed from c to d before delivery to tank 8. Bed a, which for purposes of illustration may be assumed to have its total adsorptive power for calcium and magnesium compounds exhausted, is now cut out for regeneration. This is accomplished by closing inlet valve 11 and valve 20 (and opening valve 12) and opening valves 30, 33 and 38, permitting acid solution from tank 28 to pass through bed a and out to waste pipe 37. Next valve 30 is closed and 31 opened, permitting the alkaline solution to pass through the bed and out to waste pipe. Then valves 31, 33 and 38 are closed and valves 16 and 46 opened, so that water of zero hardness will backwash bed $a$ and escape to pipe 37. Bed $a$ is then ready for re-use. When bed $d$ ceases to operate at 100 per cent efficiency bed $a$ is returned to the system by way of pipe 21, and bed $b$ is cut out for regeneration. Continuing this process, the beds are used in groups of three while the fourth is being regenerated, the last bed of each group operating at 100 per cent efficiency.

As a specific example of the softening effect of treating water with a single bed of activated bauxite according to my invention, a water showing 108 parts per million of hardness calculated as calcium carbonate and containing calcium 30 parts per million, magnesium 8 parts per million, bicarbonate ($HCO_3$) 228 parts per million, and sulfate ($SO_4$) 30 parts per million, showed zero hardness by the soap test after treatment. Gravimetric analysis showed that the calcium was completely removed and that the magnesium was reduced to 0.1 part per million and the bicarbonate content to 152 parts per million. Also the total solids content of the water was reduced by about 100 parts per million by this treatment.

What I claim is:

1. A method of treating water to decrease its content of a dissolved hardness-forming compound and decrease the total dissolved solid content of the water, comprising bringing the water into adsorbing contact with a bed the major portion of which consists of activated alumina.

2. A method of treating water to decrease its content of a dissolved hardness-forming compound and decrease the total dissolved solid content of the water, comprising bringing the water into adsorbing contact with a bed the major portion of which consists of activated alumina, the water at the time of such contact being alkaline to methyl red.

3. A method of treating water to decrease its content of a dissolved hardness-forming compound and decrease the total dissolved solid content of the water, comprising bringing the water into adsorbing contact with a bed the major portion of which consists of alumina activated at 400° to 500° C.

4. A method of treating water to decrease its content of a dissolved hardness-forming compound and decrease the total dissolved solid content of the water, comprising bringing the water into adsorbing contact with a bed the major portion of which consists of alumina activated at 400° to 500° C., the water at the time of such contact being alkaline to methyl red.

5. A method of treating water to decrease its content of a dissolved hardness-forming compound and decrease the total solid content of the water, comprising exposing the water to a bed the major portion of which consists of activated alumina, until the adsorbing power of the activated alumina is materially reduced, removing adsorbed material from the activated alumina to regenerate the same, and exposing further quantities of water to the regenerated alumina.

6. A method of treating water to decrease its content of a dissolved hardness-forming compound and decrease the total solid content of the water, comprising the steps of exposing the water to a bed the major portion of which consists of activated alumina, until the adsorbing power of the activated alumina is materially reduced, washing the activated alumina with dilute hydrochloric acid solution whereby adsorbed material is removed, and exposing further quantities of water to the regenerated alumina.

7. A method of treating water to decrease its content of a dissolved hardness-forming compound and decrease the total solid content of the water, comprising the steps of exposing the water to a bed the major portion of which consists of activated alumina, until the adsorbing power of the activated alumina is materially reduced, washing the activated alumina with dilute hydrochloric acid solution and thereafter with dilute alkali solution, whereby adsorbed material is removed, and exposing further quantities of water to the regenerated alumina.

8. A method of treating water to decrease its content of a dissolved hardness-forming compound and decrease the total solid content of the water, comprising the steps of exposing the water to a bed the major portion of which consists of activated alumina, until the adsorbing power of the activated alumina is materially reduced, washing the activated alumina with dilute hydrochloric acid solution and thereafter with dilute ammonia solution, whereby adsorbed material is removed, and exposing further quantities of water to the regenerated alumina.

9. A method of treating water to decrease its content of a dissolved hardness-forming compound and decrease the total dissolved solid content of the water, comprising bringing the water into adsorbing contact with a bed the major portion of which consists of activated alumina prepared by calcining aluminum hydrate at a temperature of 300° to 800° C.

10. A method of treating water to decrease its content of a dissolved hardness-forming compound and decrease the total dissolved solid content of the water, comprising bringing the water into adsorbing contact with a bed the major portion of which consists of activated alumina prepared by calcining aluminum hydrate at a temperature of 300° to 800° C., the water at the time of such contact being alkaline to methyl red.

11. A method of treating water to decrease its content of a dissolved hardness-forming compound and decrease the total solid content of the water, comprising exposing the water to a bed the major portion of which consists of activated alumina prepared by calcining aluminum hydrate at a temperature of 300° to 800° C., until the adsorbing power of the activated alumina is materially reduced, removing adsorbed material from the activated alumina to regenerate the same, and exposing further quantities of water to the regenerated alumina.

12. A method of treating water to decrease its content of a dissolved hardness-forming compound and decrease the total solid content of the water, comprising the steps of exposing the water to a bed the major portion of which consists of activated alumina prepared by calcining aluminum hydrate at a temperature of 300° to 800° C., until the adsorbing power of the activated alumina is materially reduced, washing the activated alumina with dilute hydrochloric acid solution whereby adsorbed material is removed, and exposing further quantities of water to the regenerated alumina.

13. A method of treating water to decrease its content of a dissolved hardness-forming compound and decrease the total solid content of the water, comprising the steps of exposing the water to a bed the major portion of which consists of activated alumina prepared by calcining aluminum hydrate at a temperature of 300° to 800°

C., until the adsorbing power of the activated alumina is materially reduced, washing the activated alumina with dilute hydrochloric acid solution and thereafter with dilute alkali solution, whereby adsorbed material is removed, and exposing further quantities of water to the regenerated alumina.

14. A method of treating water to decrease its content of a dissolved hardness-forming compound and decrease the total solid content of the water, comprising the steps of exposing the water to a bed the major portion of which consists of activated alumina prepared by calcining aluminum hydrate at a temperature of 300° to 800° C., until the adsorbing power of the activated alumina is materially reduced, washing the activated alumina with dilute hydrochloric acid solution and thereafter with dilute ammonia solution, whereby adsorbed material is removed, and exposing further quantities of water to the regenerated alumina.

HARRY V. CHURCHILL.